United States Patent
Kobayashi

(10) Patent No.: US 7,103,264 B2
(45) Date of Patent: Sep. 5, 2006

(54) INFORMATION REPRODUCING APPARATUS

(75) Inventor: Hideo Kobayashi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 506 days.

(21) Appl. No.: 10/195,472

(22) Filed: Jul. 16, 2002

(65) Prior Publication Data
US 2003/0021592 A1    Jan. 30, 2003

(30) Foreign Application Priority Data
Jul. 30, 2001    (JP)    .......................... P 2001-228915

(51) Int. Cl.
*H04N 5/91*    (2006.01)
*H04N 7/00*    (2006.01)

(52) U.S. Cl. .......................... 386/94; 386/46

(58) Field of Classification Search ................ 386/46, 386/83, 94, 95, 124, 125, 45, 40, 1; 360/15
See application file for complete search history.

(56) References Cited

U.S. PATENT DOCUMENTS 5,627,655 A * 5/1997 Okamoto et al. ............. 386/94

FOREIGN PATENT DOCUMENTS

| DE | 198 49 175 A1 | 4/2000 |
|---|---|---|
| EP | 0 993 188 A2 | 4/2000 |
| JP | 5-347744 A | 12/1993 |
| JP | 11-261950 A | 9/1999 |
| JP | 2000-069415 A | 3/2000 |
| JP | 2000-308006 A | 11/2000 |

* cited by examiner

*Primary Examiner*—Robert Chevalier
(74) *Attorney, Agent, or Firm*—Morgan, Lewis & Bockius LLP

(57) ABSTRACT

A problem is to provide an information reproducing apparatus capable of time difference reproduction of analog input video information to which a copy guard signal is added.

When analog input video information is inputted, the input video information is digitized by an A/D 51 and when a copy guard signal is detected in the input video information by a copy guard detection section 52, detection information to the effect that the copy guard signal is included is generated and by a record reproducing section 53, digital input video information is recorded on a hard disk HD along with this detection information. Then, when the detection information is included in reproduction video information reproduced by the record reproducing section 53, by a copy guard addition section 54, the copy guard signal is added to the reproduction video information to output the information.

6 Claims, 2 Drawing Sheets

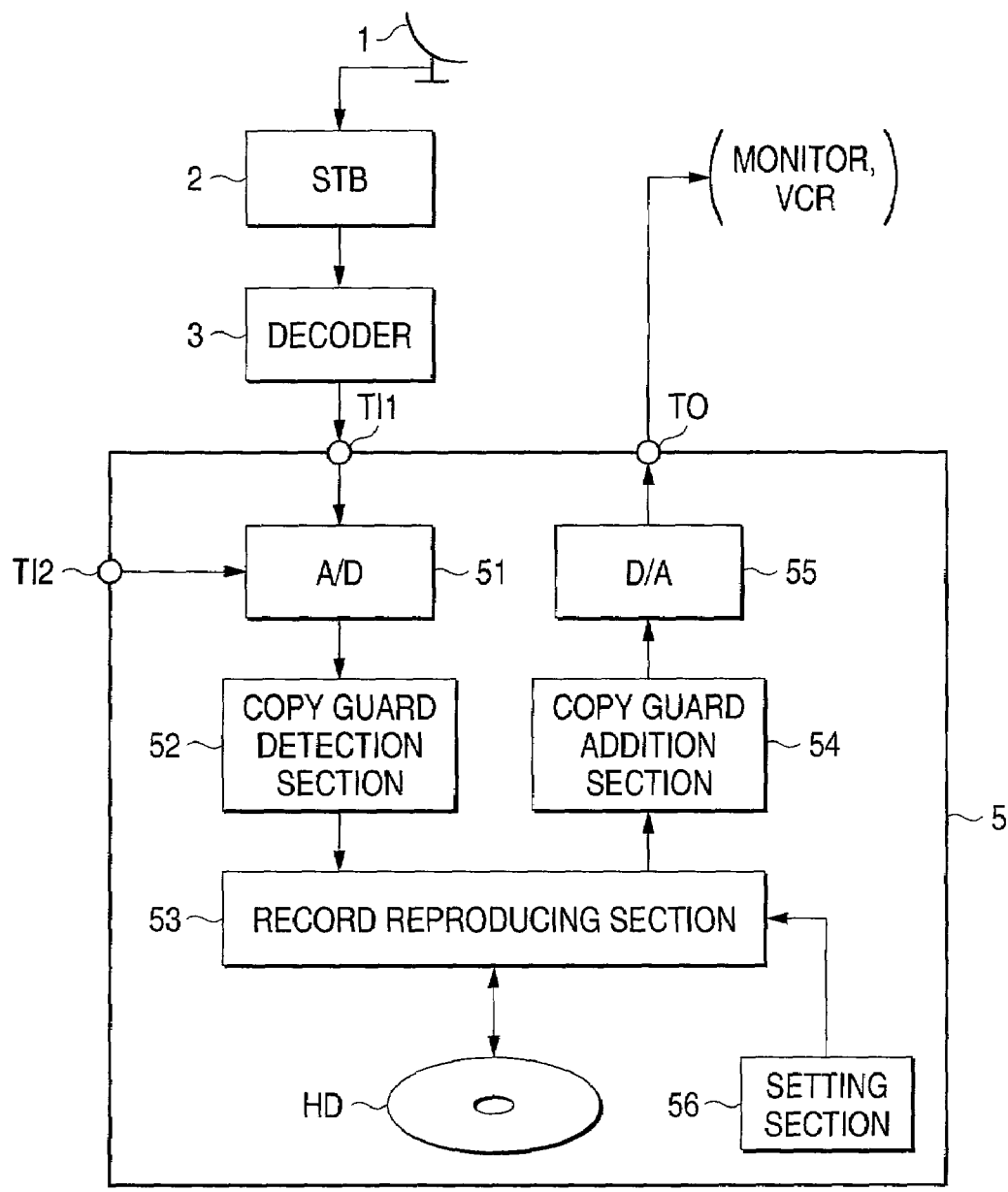

FIG. 2A (PICTURE RECORDING FILE)

| NEWS | MOVIE | BASEBALL | DRAMA |

1:00   1:30   2:00   2:30   3:00   3:30   4:00   4:30   5:00   5:30

FIG. 2B (COPY GUARD REFERENCE FILE)

1:00   1:30   2:00   2:30   3:00   3:30   4:00   4:30   5:00   5:30

00000000111111111111111111111111110000000000000000000000011111111

INFORMATION REPRODUCING APPARATUS

BACKGROUND OF THE INVENTION

1. Technical Field

This invention relates to an information reproducing apparatus having a time difference reproducing function for recording input video information by a predefined predetermined time on a record disk and also reproducing record video information recorded on the record disk back to the predetermined time at a maximum.

2. Related Art

Conventionally, in an information reproducing apparatus having a time difference reproducing function, for example, analog input video information by two hours is digitized to record the information on a hard disk which is a record disk and record information of the hard disk can be reproduced back to the two hours ago at a maximum.

By the way, with regard to movies and other video information, an illegal copy is inhibited for copyright protection and as a technique of that purpose, there is a macrovision specification and this is a technique of adding a copy guard signal to a burst interval of an analog video signal as described in Japanese Patent No. 2895629 or the Unexamined Japanese Patent Application No.2000-308006.

According to this specification, in case that a video signal attempts to be copied by a VCR (Video Cassette Recorder) of analog type, dummy synchronous signal and color burst signal along with the video signal are recorded on a videotape, so that the video signal cannot be reproduced normally and the illegal copy is prevented.

[Problems to be Solved]

On the other hand, in the case of the information reproducing apparatus having the time difference reproducing function described above, there is no apparatus for recording video information on a hard disk for the purpose of copying and a primary purpose is to reproduce the video information back to a certain time, so that it is desirable to be able to perform time difference reproduction even in the case of the analog input video information to which the copy guard signal like the macrovision described above is added.

In order to enable the time difference reproduction by the information reproducing apparatus having the time difference reproducing function even in the case of the analog input video information to which the copy guard signal is added thus, it is necessary to add a copy guard signal to the reproduced video information in order to prevent the illegal copy while erasing record information of the hard disk after the reproduction.

However, in the information reproducing apparatus of this kind, there is no apparatus for providing a function of adding the copy guard signal thus and in an information reproducing apparatus having a conventional time difference reproducing function, time difference reproduction of the analog input video information to which the copy guard signal is added cannot be performed.

By the way, in Japanese Patent No. 3128959 or the Unexamined Japanese Patent Application No. Hei6-70282, etc. besides Japanese Patent No. 2895629 or the Unexamined Japanese Patent Application No.2000-308006 described above, techniques of inhibiting an illegal copy are described, but these apparatus do not relate to an information reproducing apparatus having a time difference reproducing function as shown in the invention of the present application.

SUMMARY OF THE INVENTION

Therefore, an object of the present invention is to provide an information reproducing apparatus capable of time difference reproduction of input video information to which a copy guard signal is added.

[Means for Solving the Problems]

In order to achieve the object, the present invention is characterized by an information reproducing apparatus having a time difference reproducing function for digitizing analog input video information by a predefined predetermined time to record the information on a record disk and also reproducing record video information recorded on the record disk back to the predetermined time at a maximum, comprising a setting section for making variable settings of the predetermined time, a detection section for detecting a copy guard signal included in the input video information and generating detection information to the effect that the copy guard signal is included, an analog-to-digital conversion section for digitizing the analog input video information, a record reproducing section for recording the digitized input video information along with the detection information on the record disk and when the input video information exceeds the predetermined time by the setting section at that time, making an overwriting recording from the head position of recording of the record disk and when record video information recorded on the record disk is reproduced, sequentially erasing the reproduced record video information from the record disk while reproducing the record video information along with the detection information, and an addition section for adding the copy guard signal to reproduction video information when the detection information is included in the reproduction video information reproduced by the record reproducing section and outputting the information to an output terminal.

According to such a configuration, the copy guard signal included in the input video information is detected by the detection section and the detection information to the effect that the copy guard signal is included is generated and the digitized input video information is recorded on the record disk along with the detection information by the record reproducing section.

Then, by the record reproducing section, the detection information is also reproduced together when the record video information recorded on the record disk is reproduced, and the record video information reproduced while reproduction is completed is sequentially erased from the record disk, and by the addition section, the copy guard signal is added to reproduction video information in which the detection information is included and the information is outputted to the output terminal.

As a result of that, even in the case of the analog input video information to which the copy guard signal is added, time difference reproduction can be performed and information after the reproduction does not remain in the record disk at all and also video information to which the copy guard signal is added as well as the original input video information can be outputted from the output terminal to prevent an illegal copy in a post stage.

Also, the present invention is characterized by an information reproducing apparatus having a time difference reproducing function for recording input video information by a predefined predetermined time on a record disk and also reproducing record video information recorded on the record disk back to the predetermined time at a maximum, comprising a detection section for detecting a copy guard signal included in the input video information and generating detection information to the effect that the copy guard signal is included, a processing section for recording the input video information along with the detection information on the record disk and when record video information recorded on the record disk is reproduced, reproducing the record video information along with the detection information, and an addition section for adding the copy guard signal to reproduction video information when the detection information is included in the reproduction video information reproduced by the processing section and outputting the information to an output terminal.

According to such a configuration, the copy guard signal included in the input video information is detected by the detection section and the detection information to the effect that the copy guard signal is included is generated and the input video information is recorded on the record disk along with the detection information by the processing section. Then, by the processing section, the detection information is also reproduced together when the record video information recorded on the record disk is reproduced, and by the addition section, the copy guard signal is added to reproduction video information in which the detection information is included and the information is outputted to the output terminal, so that even in the case of the input video information to which the copy guard signal is added, time difference reproduction can be performed and video information to which the copy guard signal is added as well as the original input video information can be outputted from the output terminal to prevent an illegal copy in a post stage.

Also, the present invention is characterized in that the processing section sequentially erases the reproduced record video information from the record disk. According to such a configuration, when reproduction of the record video information of the record disk by the record reproducing section is completed, the record video information is erased from the record disk by the processing section and does not remain in the record disk, so that an illegal copy is not caused.

Also, the present invention is characterized in that the processing section comprises an analog-to-digital conversion section for digitizing the input video information of analog, a record reproducing section for making recording to the record disk of the digitized input video information and reproduction of the record video information, and a digital-to-analog conversion section for making a digital-to-analog conversion of reproduction video information reproduced by the record reproducing section.

According to such a configuration, time difference reproduction of the analog input video information to which the copy guard signal is added can be performed.

Also, the present invention is characterized in that the processing section overwrites and records input video information exceeding the predetermined time from the head position of recording of the record disk. According to such a configuration, the record disk with the limited capacity can be used effectively and time difference reproduction by the predetermined time is primarily enabled, so that there is no trouble practically even when the input video information exceeding the predetermined time is overwritten from the head position of recording of the record disk.

Also, the present invention is characterized in that there is provided a setting section for making variable settings of the predetermined time. According to such a configuration, the variable settings of the maximum time capable of ascending in time difference reproduction can be made to meet preferences of a user.

BRIEF DESCRIPTION OF THE DRAWINGS

FIG. 1 is a block diagram of one embodiment of the present invention.

FIGS. 2A and 2B are operational illustrations of one embodiment of the present invention.

DETAILED DESCRIPTION OF THE PREFERRED EMBODIMENTS

[Mode for Carrying out the Invention]

One embodiment of this invention will be described with reference to FIGS. 1 and 2. But, FIG. 1 is a block diagram and FIG. 2 is an operational illustration.

An information reproducing apparatus in the present embodiment is constructed, for example, as shown in FIG. 1, that is, when satellite broadcasting is received by a set-top box (hereinafter called STB) 2 equipped with a tuner for satellite broadcasting receiving through a receiving antenna 1 for satellite broadcasting, the received signal is inputted to a decoder 3 and a scramble of a predetermined method applied to the received signal is released by the decoder 3 and input video information of the satellite broadcasting after the scramble release is inputted to an input terminal TI1 of an information reproducing apparatus 5. Also, it is constructed so that other analog input video information is inputted to another input terminal TI2 of the information reproducing apparatus 5.

Then, as shown in FIG. 1, the analog input video information inputted to these input terminals TI1 or TI2 is inputted to the information reproducing apparatus 5 and time difference reproduction is performed. This information reproducing apparatus 5 comprises an analog-to-digital conversion section (hereinafter called A/D) 51, a copy guard detection section 52, a record reproducing section 53, a copy guard addition section 54, a digital-to-analog conversion section (hereinafter called D/A) 55, a setting section 56 and a hard disk HD which is a record disk. Here, a processing section of the present invention is constructed of the A/D 51, the record reproducing section 53 and the D/A 55.

When the analog input video information is inputted through the input terminal TI1 or TI2, the input video information is digitized by the A/D 51 and it is detected whether a copy guard signal is added or not by the copy guard detection section 52. At this time, in the case that a copy guard is the macrovision method described above, an IC for video input of model SAA7113H made by Philips Corp. can be used as the A/D 51 and the copy guard detection section 52, and according to this IC, an analog-to-digital conversion can be made and the presence or absence of the copy guard by the macrovision can be detected.

Then, when the copy guard signal is detected by the copy guard detection section 52, detection information to the effect that the copy guard signal is included is generated, and digital input video information is recorded on the hard disk HD along with this detection information by the record reproducing section 53. On the other hand, by the record reproducing section 53, while reproduction of record video information recorded on the hard disk HD is completed, the reproduced record video information is sequentially erased from the hard disk HD.

Referring more particularly to record processing to the hard disk HD, by the record processing through the record reproducing section 53, a picture recording file as shown in FIG. 2A is formed on the hard disk HD and in this picture recording file, video information of various programs by the satellite broadcasting of "news", "movie", "baseball", "drama", etc. received by the antenna 1 and the STB 2 (see FIG. 1) is sequentially recorded on the hard disk HD every broadcasting time zone.

Also, in parallel with such a picture recording file, a copy guard reference file for recording detection information about the video information every each program of "news" or "movie", etc. described above as shown in FIG. 2B is formed on the hard disk HD, and when the copy guard signal is absent, detection information of "0" indicating its fact is repeatedly recorded every constant time and when the copy guard signal is present, detection information of "1" indicating its fact is repeatedly recorded every constant time. Incidentally, the constant time in this case is preferably one second to several seconds.

For example, in the case of the "news" program, generally, there is no need to inhibit an illegal copy and video information of the "news" program does not include the copy guard signal, so that detection information in which "0" as "0000 . . . 00" continues in a record time zone of the video information of the "news" program is recorded in the copy guard reference file. On the other hand, in the case of the "movie" program, there is a need to inhibit the illegal copy and video information of the "movie" program includes the copy guard signal, so that detection information in which "1" as "1111 . . . 11" continues in a record time zone of the video information of the "movie" program is recorded in the copy guard reference file.

By the way, the setting section 56 is provided with various operation keys including a ten-key pad and, for example, it is constructed so that variable setting of the maximum time (corresponding to a predetermined time in the present invention) capable of ascent in the case of performing time difference reproduction can be made by an operation of the ten-key pad, and a user can select and set a desired time among, for example, thirty minutes, one hour, two hours, three hours, four hours and so on.

Incidentally, instead of the ten-key pad, time setting may be made by providing selection keys corresponding to each time of thirty minutes, one hour, two hours, etc. and operating any of these selection keys.

Then, the record reproducing section 53 overwrites returning to the head position of recording of the hard disk HD when input video information of the program exceeds the time set by the setting section 56. As a result of that, it is constructed so that the time difference reproduction beyond the time set by the setting section 56 cannot be performed.

Also, when record video information recorded on the hard disk HD is reproduced, the record reproducing section 53 sequentially erases the reproduced record video information from the hard disk HD while reproducing the record video information along with the detection information (see FIG. 2B). As a result of that, the video information in which the reproduction is completed does not remain in the hard disk HD and it applies to an illegal copy act. Incidentally, unless the reproduction is performed, the record video information recorded on the hard disk HD is not erased.

Further, when the detection information is included in reproduction video information reproduced by the record reproducing section 53, a copy guard signal is added to the reproduction video information by the copy guard addition section 54 and the information is formed into analog form by the D/A 55 and is outputted to external display equipment such as a monitor or a VCR of a television picture receiver etc. through an output terminal TO. But, when the detection information is not included in the reproduction video information reproduced, the reproduction video information is outputted as it is. For example, in the copy guard reference file, the detection information of "1111. . . " is recorded in record video information of the "movie" program, so that a copy guard signal is added to reproduction video information of the "movie" program by the copy guard addition section 54 and a copy guard signal is not added to reproduction video information of the "news" program.

At this time, in the case that a copy guard is the macrovision method described above, a digital video encoder IC of model SAA7120 made by Philips Corp. can be used as the copy guard addition section 54 and the D/A 55, and according to this IC, a digital-to-analog conversion can be made and the copy guard signal by the macrovision can be added to a burst interval.

Then, in the case that the VCR is connected to the output terminal TO, when the reproduction video information to which the copy guard signal is added by the copy guard addition section 54 is outputted through the output terminal TO as described above, an illegal copy by the VCR is inhibited and on the contrary, in the case that the monitor of the television picture receiver etc. is connected to the output terminal TO, reproduction video is normally displayed by the monitor regardless of whether or not the copy guard signal is added to the reproduction video information from the output terminal TO.

In this manner, when the copy guard signal included in the input video information is detected by the copy guard detection section 52, the detection information to the effect that the copy guard signal is included is generated, and this detection information is recorded on the hard disk HD along with the input video information by the record reproducing section 53.

Then, by the record reproducing section 53, while the detection information is also reproduced together in the case of reproducing the record video information recorded on the hard disk HD, the reproduced record video information is erased from the hard disk HD, and by the copy guard addition section 54, the copy guard signal is added to the reproduction video information in which the detection information is included and the information is outputted to the output terminal TO.

Therefore, according to the embodiment described above, even in the case of the analog input video information to which the copy guard signal is added, time difference reproduction can be performed and information after the reproduction does not remain in the hard disk HD at all and also video information to which the copy guard signal is added as well as the original input video information can be outputted from the output terminal TO and an illegal copy can be prevented in a post stage.

Also, by the setting section 56, the maximum time capable of ascending in time difference reproduction can be varied, so that this maximum time can be set to meet preferences of a user.

Incidentally, in the embodiment described above, the copy guard of the macrovision method has been given as an example, but the present invention applicable is not limited to the macrovision method.

Also, in the embodiment described above, the case of performing the time difference reproduction of the analog input video information to which the copy guard signal is added has been described, but the present invention can be applied to even digital input video information to which the copy guard signal is added and the effect similar to the embodiment described above can be obtained.

Further, in the embodiment described above, the case of using the hard disk HD as a record disk has been described, but of course, the record disk is not limited to the hard disk.

Also, the present invention is not limited to the embodiment described above, and various changes other than the embodiment described above can be made unless departing from the meaning.

EFFECT OF THE INVENTION

As described above, according to the invention as defined in claim 1, the copy guard signal included in the input video information is detected by the detection section and the detection information to the effect that the copy guard signal is included is generated and the digitized input video information is recorded on the record disk along with the detection information by the record reproducing section, and by the record reproducing section, the detection information is also reproduced together when the record video information recorded on the record disk is reproduced, and the record video information reproduced while reproduction is completed is sequentially erased from the record disk, and by the addition section, the copy guard signal is added to reproduction video information in which the detection information is included and the information is outputted to the output terminal, so that even in the case of the analog input video information to which the copy guard signal is added, time difference reproduction can be performed and information after the reproduction does not remain in the record disk at all and also video information to which the copy guard signal is added as well as the original input video information can be outputted from the output terminal to prevent an illegal copy in a post stage, and an information reproducing apparatus capable of the time difference reproduction of the analog input video information to which the copy guard signal is added can be provided.

Also, according to the invention as defined in claim 2, the copy guard signal included in the input video information is detected by the detection section and the detection information to the effect that the copy guard signal is included is generated and by the record reproducing section, the input video information is recorded on the record disk along with the detection information and by the record reproducing section, the detection information is also reproduced together when the record video information recorded on the record disk is reproduced and by the addition section, the copy guard signal is added to reproduction video information in which the detection information is included and the information is outputted to the output terminal, so that even in the case of the input video information to which the copy guard signal is added, time difference reproduction can be performed and video information to which the copy guard signal is added as well as the original input video information can be outputted from the output terminal to prevent an illegal copy in a post stage.

Also, according to the invention as defined in claim 3, when reproduction of the record video information recorded on the record disk is completed, the record video information is erased from the record disk and does not remain in the record disk, so that an illegal copy is not caused.

Also, according to the invention as defined in claim 4, time difference reproduction of the analog input video information to which the copy guard signal is added can be performed.

Also, according to the invention as defined in claim 5, the record disk with the limited capacity can be used effectively and time difference reproduction by the predetermined time is primarily enabled, so that there is no trouble practically even when the input video information exceeding the predetermined time is overwritten from the head position of recording of the record disk.

Also, according to the invention as defined in claim 6, the variable settings of the maximum time capable of ascending in time difference reproduction can be made to meet preferences of a user.

What is claimed is:

1. An information reproducing apparatus having a time difference reproducing function for digitizing analog input video information by a predefined predetermined time to record the information on a record disk and reproducing record video information recorded on the record disk back to the predetermined time at a maximum, said information reproducing apparatus comprising:
a setting section for making variable settings of the predetermined time,
a detection section for detecting a copy guard signal included in the input video information and generating detection information to the effect that the copy guard signal is included,
an analog-to-digital conversion section for digitizing the analog input video information,
a record reproducing section for recording the digitized input video information along with the detection information on the record disk, when the input video information exceeds the predetermined time by the setting section at the time, making an overwriting recording from the head position of recording of the record disk, and when record video information recorded on the record disk is reproduced, sequentially erasing the reproduced record video information from the record disk while reproducing the record video information along with the detection information, and
an addition section for adding the copy guard signal to reproduction video information when the detection information is included in the reproduction video information reproduced by the record reproducing section, and outputting the information to an output terminal.

2. An information reproducing apparatus having a time difference reproducing function for recording input video information by a predefined predetermined time on a record disk and reproducing record video information recorded on the record disk back to the predetermined time at a maximum, said information reproducing apparatus comprising:
a detection section for detecting a copy guard signal included in the input video information, and generating detection information to the effect that the copy guard signal is included,
a processing section for recording the input video information along with the detection information on the record disk, and when record video information recorded on the record disk is reproduced, reproducing the record video information along with the detection information, and
an addition section for adding the copy guard signal to reproduction video information, when the detection information is included in the reproduction video information reproduced by said processing section and outputting the information to an output terminal, wherein
said processing section sequentially erases the reproduced record video information from the record disk.

3. The information reproducing apparatus as defined in claim 2, wherein said processing section comprising:
an analog-to-digital conversion section for digitizing the input video information of analog,
a record reproducing section for making recording to the record disk of the digitized input video information and reproduction of the record video information, and
a digital-to-analog conversion section for making a digital-to-analog conversion of reproduction video information reproduced by said record reproducing section.

4. An information reproducing apparatus having a time difference reproducing function for recording input video information by a predefined predetermined time on a record disk and reproducing record video information recorded on the record disk back to the predetermined time at a maximum, said information reproducing apparatus comprising:
a detection section for detecting a copy guard signal included in the input video information, and generating detection information to the effect that the copy guard signal is included,
a processing section for recording the input video information along with the detection information on the record disk, and when record video information recorded on the record disk is reproduced, reproducing the record video information along with the detection information, and
an addition section for adding the copy guard signal to reproduction video information, when the detection information is included in the reproduction video information reproduced by said processing section and outputting the information to an output terminal, wherein
said processing section overwrites and records input video information exceeding the predetermined time from the head position of recording of the record disk.

5. The information reproducing apparatus as defined in claim 2, further comprising:
a setting section for making variable settings of the predetermined time.

6. The information reproducing apparatus as defined in claim 4, further comprising a setting section for making variable settings of the predetermined time.

* * * * *